March 30, 1965
J. KREEFT ETAL
3,175,245
TENTERING APPARATUS
Filed April 30, 1963
4 Sheets-Sheet 1
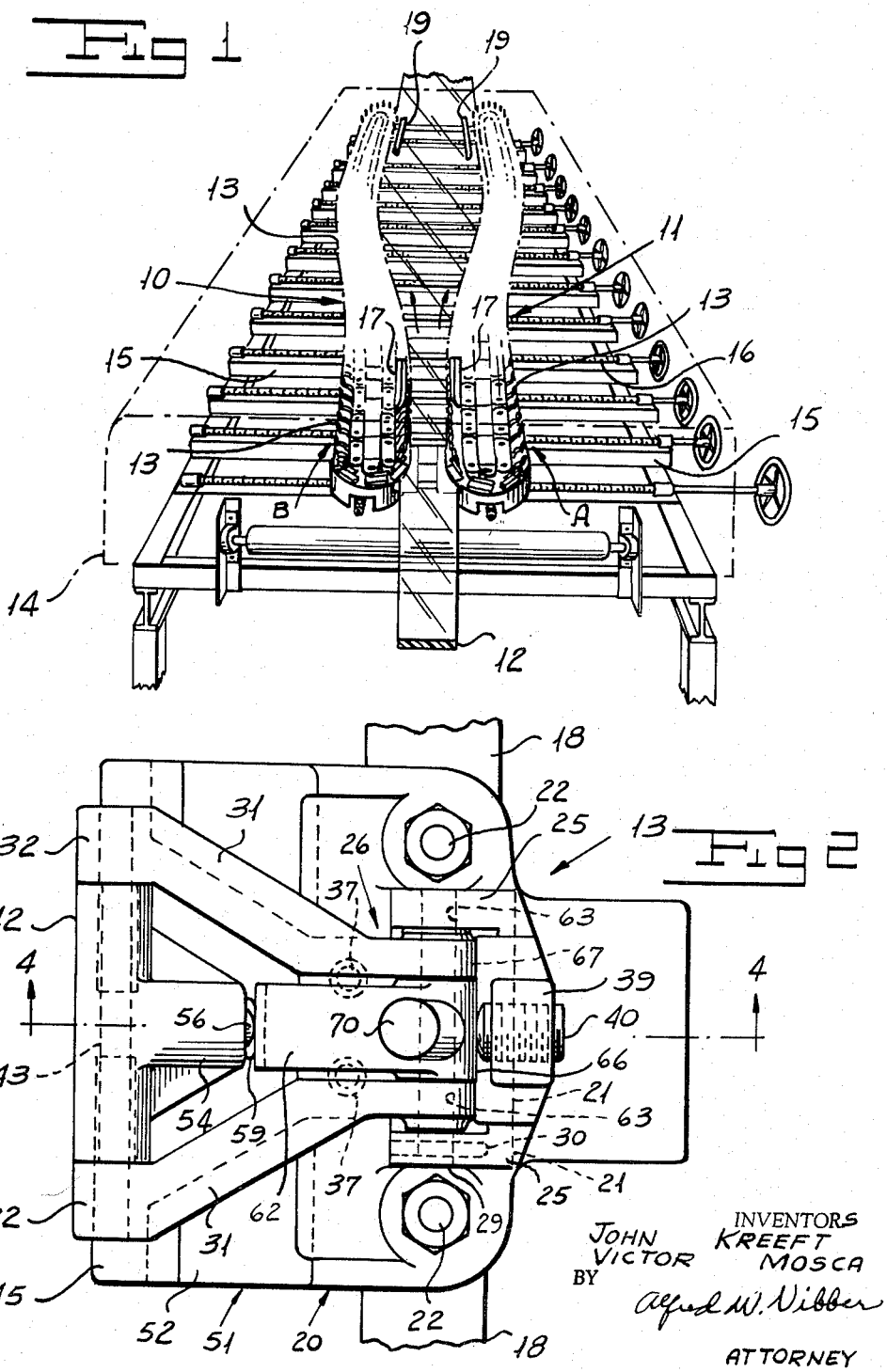
INVENTORS
JOHN KREEFT
VICTOR MOSCA
BY
Alfred W. Nibber
ATTORNEY March 30, 1965　　　J. KREEFT ETAL　　　3,175,245
TENTERING APPARATUS
Filed April 30, 1963　　　　　　　　　　　4 Sheets-Sheet 2
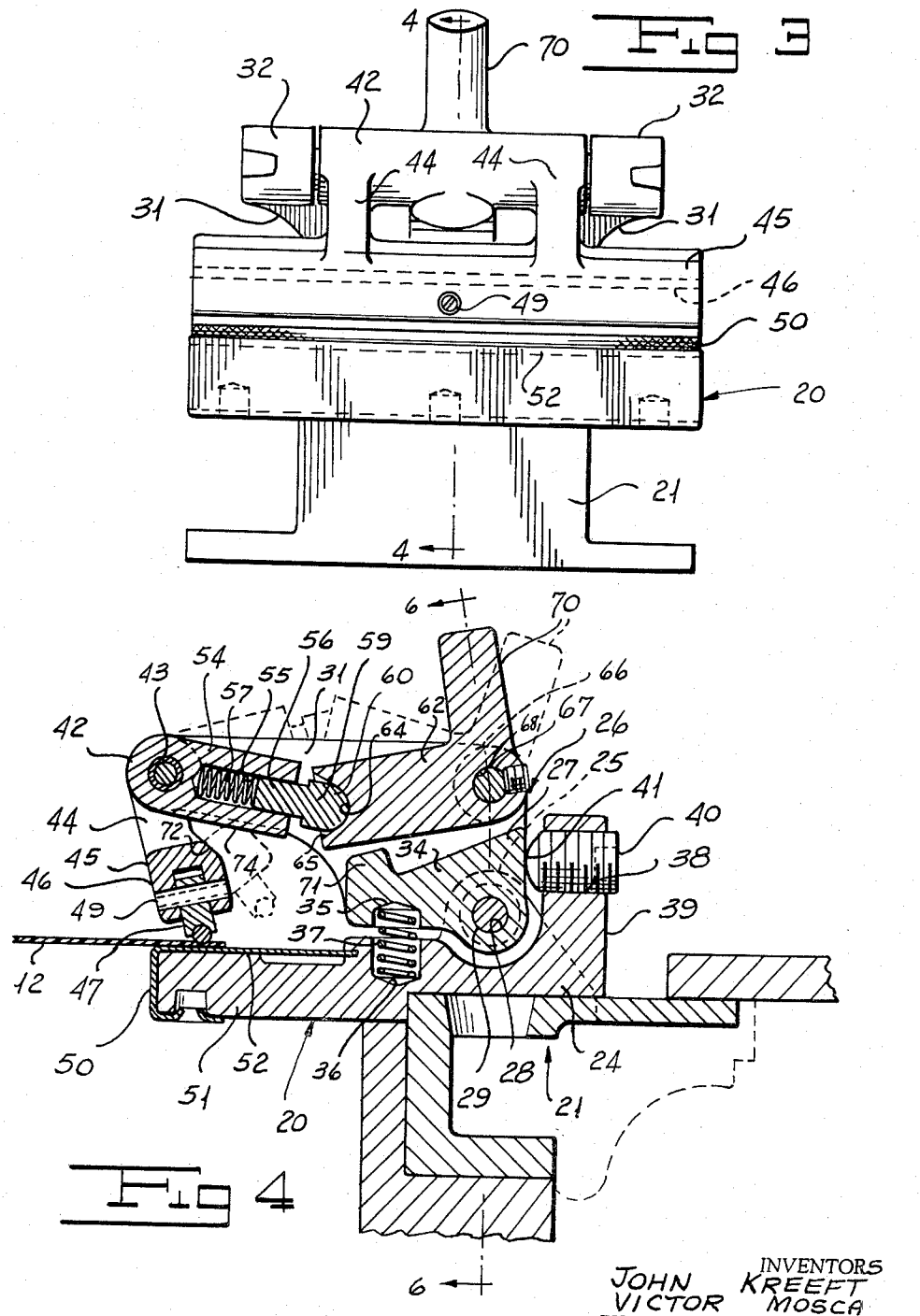
INVENTORS
JOHN KREEFT
VICTOR MOSCA
BY
Alfred W. Nibber
ATTORNEY

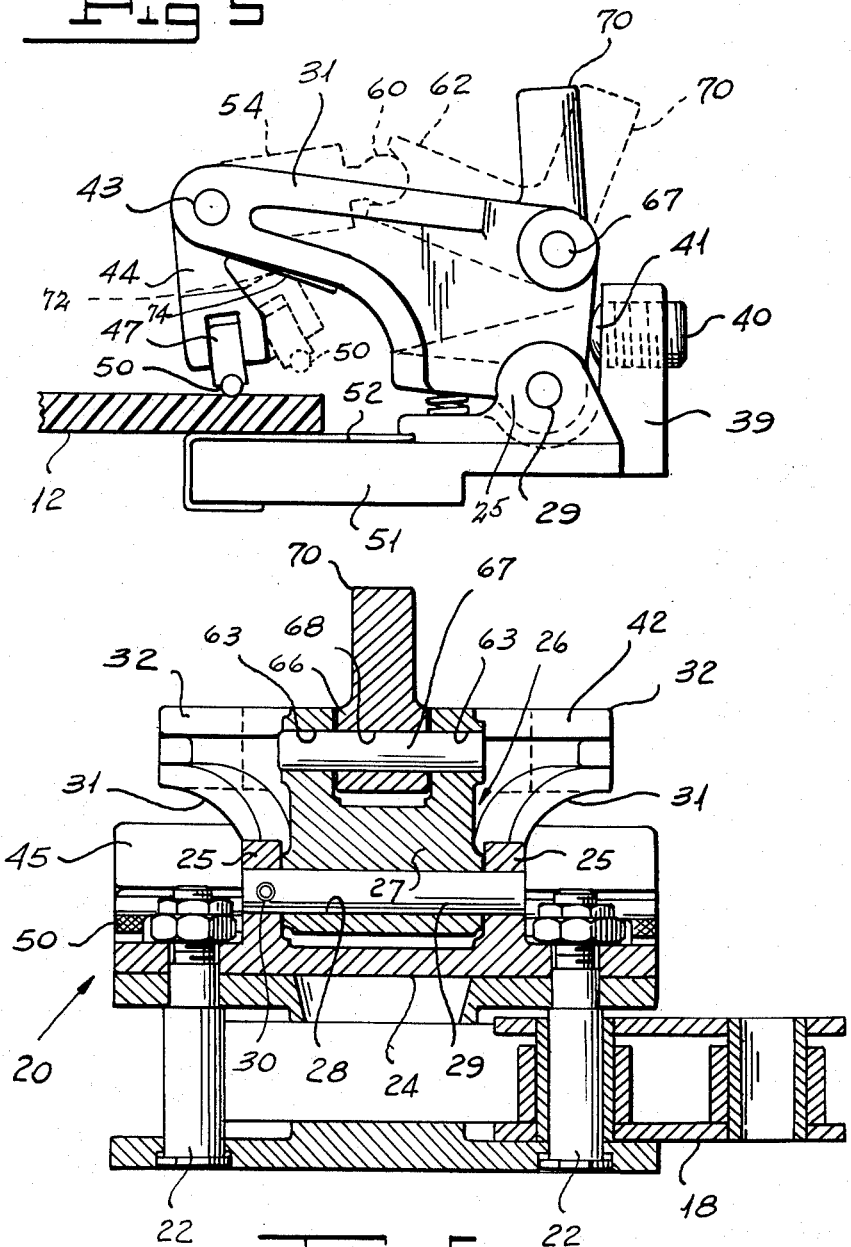

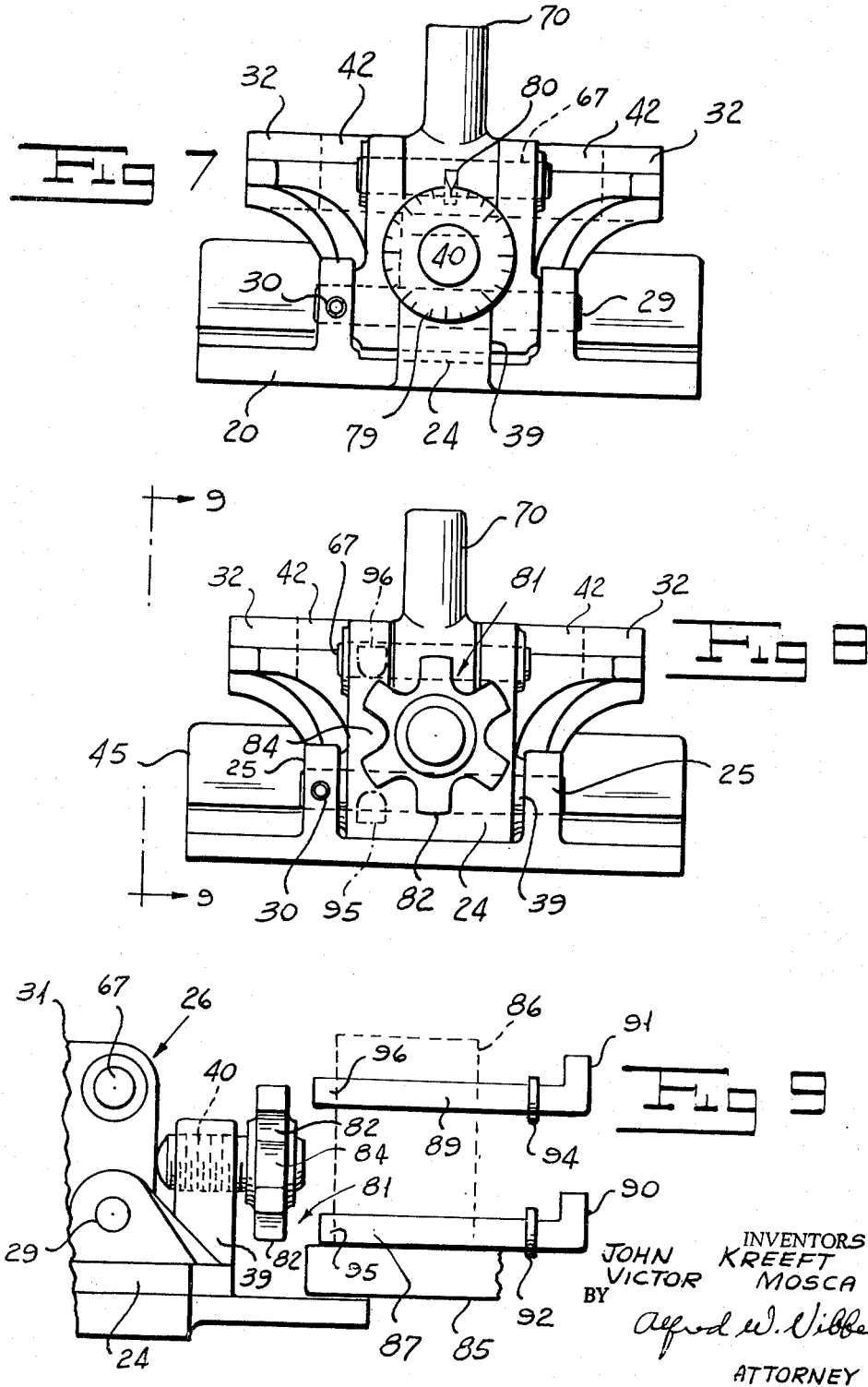

United States Patent Office 3,175,245
Patented Mar. 30, 1965

3,175,245
TENTERING APPARATUS
John Kreeft, Wyckoff, and Victor Mosca, Paterson, N.J., assignors to Morrison Machine Co., Paterson, N.J., a corporation of New Jersey
Filed Apr. 30, 1963, Ser. No. 276,944
18 Claims. (Cl. 18—1)

This invention relates to tentering apparatus, and is particularly concerned with an improved tenter clip with an adjustable mouth for handling sheet materials having an appreciable range of thickness, and to a tentering system incorporating a plurality of such clips.

The tenter clip in accordance wtih the invention is adapted for use in stretching a variety of sheet materials, among them being plastic material such as polyvinylidene chloride. Such material is conventionally extruded in sheet form substantially thicker than is finally desired, and is then stretched in either one or both directions to reduce it to the desired thickness, and to orient its molecules in order to increase its strength. Such plastic material, may, according to the use to which it is to be put, range in thickness in its extruded form from a few hundredths of an inch to ¼ inch. It is desirable that the sheet material gripping means or tenter clips of the stretching or tentering apparatus employed for processing the extruded plastic material shall be readily adjustable in order to treat plastic material throughout an extended range of thickness with equal efficiency.

It has been found that tenter clips conventionally employed in the stretching of cloth lack the requisite adjustability necessary for the treatment of a variety of thicknesses of plastic sheet material, as carried out in commercial plastic sheet producing plants. Thus the ordinary cloth tenter clip is designed for, and will operate satisfactorily with a narrow range of thicknesses of cloth. Further, the movable jaw of cloth tentering clips are usually brought into initial contact with the cloth by gravity only.

When it is attempted to employ cloth tenter clips with plastic sheet material, and particularly to use them with a relatively wide range of thicknesses of plastic material, is is found that the clips lack the requisite positiveness of holding of the plastic sheet material, and that such clips can be used on material having only a narrow range of thickness.

It is among the objects of the invention to provide a novel tenter clip which grips with substantially the same positiveness and efficiency all materials within a wide range of thickness of such materials.

Another object of the invention is the provision of an improved adjustable tenter clip adapted for use with sheet materials having a wide range of thickness.

Yet another object of the invention resides in the provision of an adjustable tenter clip, the material gripping mouth of which may be quickly and accurately adjusted throughout a wide range.

A further object of the invention lies in the provision of an adjustable tenter clip which grips sheet material with substantially the same positiveness and efficiency throughout the range of adjustment of the clip.

Another object of the invention lies in the provision of a novel tenter clip wherein the movable gripping jaw is initially resiliently urged into gripping engagement with the sheet material to be stretched.

A still further object of the invention lies in the provision of an adjustable tenter clip which is simple and rugged in construction, economical of manufacture, and has a long substantially maintenance-free operative life.

Another object of the invention lies in the provision of novel tentering apparatus incorporating a plurality of tenter clips in accordance with the invention.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a somewhat schematic view in perspective of tentering apparatus in accordance with the invention, the apparatus being shown adjusted for the stretching of a sheet of thermoplastic material;

FIG. 2 is a view in plan of a tenter clip employed in the tentering apparatus of FIG. 1, the clip being shown in closed position, a connected intermediate link of the tentering chain of the apparatus being shown attached to the clip;

FIG. 3 is a view in front elevation of the tenter clip of FIG. 2 and its attached link portion of the tentering chain;

FIG. 4 is a view in vertical axial section through the tentering clip, the section being taken along the line 4—4 of FIG. 3, the clip being shown adjusted to a condition near its minimum material accepting opening, the movable jaw of the clip and its operating elements being shown in full lines in completely closed material gripping position, and in phantom lines in fully open sheet material accepting position;

FIG. 5 is a view in side elevation of the tenter clip adjusted to a condition near its maximum material accepting opening, the movable jaw of the clip and its operating elements being shown in full lines in closed position and in phantom lines in fully open position;

FIG. 6 is a view in substantially vertical section through the rear of the clip, the section being taken along the broken section line 6—6 of FIG. 4, the parts of the clip being shown in the open position corresponding to the phantom line position of FIG. 4;

FIG. 7 is a view in rear elevation of a clip in accordance with the invention incorporating a first modified mechanism for adjusting the open position of the movable jaw of the clip;

FIG. 8 is a view in rear elevation of a clip in accordance with the invention incorporating a second modified mechanism for adjusting the open position of the movable jaw of the clip;

FIG. 9 is a fragmentary view in end elevation of the clip of FIG. 8 taken from line 9—9 of FIG. 8, the view also showing selectively operated means mounted on the tentering apparatus cooperating with the adjusting mechanism of the clip of FIG. 8 to adjust the open position of the movable jaw of such clip in either direction.

Turning now to FIG. 1, there is there shown somewhat schematically a tentering apparatus for the stretching of a sheet of plastic sheet material, indicated generally by the reference character 12, which is progressively gripped along its edges by tenter clips 13 of opposed tentering chains 10 and 11. Chains 10 and 11 are each made up of a series of connected larger links 21, to which clips 13 are attached, and shorter intermediate links 18. As thus gripped, sheet 12 is carried through an oven or kiln schematically shown at 14, the chains in their travel in the direction away from the reader in FIG. 1 being diverted in an intermediate zone so as progressively to stretch the heated sheet. To permit adjustment of the contour of the chains, the chains are supported on a framework having a plurality of parallel cross frame members 15 spaced therealong. Each cross frame member carries its individually adjustable portions of tracks (not specifically shown) for both runs of the opposed tentering chains 10 and 11. The portions of such tracks overlying each cross frame member 15 are adjusted toward or away from each other, as required to produce the desired track contour, by screws 16 mounted above each member 15, the opposite ends of the screws being of opposite hand and equal pitch, so that turning of the screws causes opposed track sections to approach or be retracted from each other upon turning the scews.

The edges of the plastic sheet material being treated enter between the bed plates and opposed open jaws of the tenter clips 13 at the forward ends of chains 10 and 11 nearer the reader in FIG. 1. The jaws of the clips are then closed, as by engagement of the laterally outer sides of operating arms 70 of the clips with fixed cam tracks 17 positioned above the clips a short distance rearwardly from the forward ends of the chains. The clips remain closed throughout the travel rearwardly of the inner runs of the chains, being opened at the rear ends of such runs, to release the now stretched plastic sheet material, by engagement of the laterally inner sides of arms 70 with further fixed cam tracks 19, positioned above the clips a short distance forwardly from the rear ends of the chains, which open the clips to their fully open position. The tenter clips 13 are of such construction that the movable jaws thereof remain stably in their adjusted, fully open position until closed by tracks 17, and remain stably in their material-gripping position until they are opened by control wheels 19.

The tenter clip 13 and its manner of operation are illustrated in FIGS. 2–6, inclusive. Each clip 13 has an extended generally flat base or body portion 20 which may be made of cast metal, which is secured to its link 21 by elongated pins 22, as most clearly shown in FIG. 6, pins 22 also serving to connect intermediate links 18 to link 21. The links 18 and 21 of the tentering chain are guided in the above mentioned adjustable track sections, a portion of one of such track sections being schematically shown in FIG. 4.

Body 20 of tenter clip 13 has a forward, gripping jaw or bed forming portion 51 and a rear portion 24 overlying the link 21. Rising from portion 24 of the body of the clip are two spaced parallel ears 25 having bores therethrough aligned parallel with the length of the clip body, along the direction of operative travel of the clip. A sub-frame 26, likewise made of cast metal in the illustrative embodiment, which extends generally transversely of the length of body 20 has a rear cross portion 27 (FIG. 6) accurately fitting between ears 25 and provided with a bore 28 therethrough adjacent its lower end. A pivot pin 29 extends through the bores in ears 25 and the bore 28, being retained by a locking spring 30 in one of ears 25. The sub-frame 26 may thus pivot to a limited extent in a plane transverse to the length of the body of the clip. Such pivotal mounting of sub-frame 26 makes it possible to adjust the height of the mouth opening of the clip. The mouth adjusting mechanism will be specifically described later herein.

The sub-frame 26 has two arms 31 projecting generally forwardly from the opposite ends of rear cross portion 27 thereof. The arms 31 extend angularly outwardly in opposite directions from the lateral central plane of the body 20 of the clip and overlie the forward portion 51 of such body as shown most clearly in FIG. 2. The widely spaced forward ends of the two arms 31 are each provided with a similar boss 32, the bosses 32 being provided with aligned pivot pin receiving bores for supporting the movable upper gripping jaw of the tenter clip, to be described.

The sub-frame 26 is constantly urged in a clockwise direction (FIGS. 4 and 5) by the following mechanism. Centrally of rear cross portion 27 of the sub-frame there is provided a forwardly projecting lever arm 34 integral therewith. Arm 34 overlies and is located a short distance above the upper surface of the central forward part of portion 24 of body 20. Two longitudinally aligned spaced downwardly open spring seats 35 are provided in the under side of arm 34, such seats being aligned with upwardly open spring seats 36 in body portion 24. A coil compression spring 37 is positioned between each set of spring seats 35, 36, the springs being of such length as to be under substantial compression throughout the permissible range of pivoting of sub-frame 26.

The sub-frame is adjusted to determine the height of opening of the mouth of the clip as follows. Centrally of the length of the body 20 and on the rear of portion 24 thereof is a pedestal 39 integral with the body. Pedestal 39 overlies and is normally spaced somewhat from the central rear surface 41 of the central transverse portion 27 of the sub-frame. Extending through pedestal 39 is a horizontal central threaded hole receiving a stud 40 having a rounded forward end which engages surface 41 on the sub-frame at a location a substantial distance above the axis of pin 29 about which the sub-frame pivots. Stud 40 may be retained securely in adjusted position as by a nylon insert 38 in the stud, the insert compressively engaging the threads of the hole in pedestal 39. By turning stud 40 in a suitable direction the sub-frame may be adjusted from the position of FIG. 4, wherein it is shown adjusted to grip a thin sheet of material 12 to the position of FIG. 5, wherein it is adjusted to grip a relatively thick sheet, which may have, for example, a thickness on the order of ¼ inch. In all of the adjusted positions of the sub-frame the springs 37 maintain surface 41 of the sub-frame stably in contact with the inner end of stud 40 regardless of the position or operation of the movable jaw of the clip.

The movable jaw of the clip is supported by an elongated boss 42 which accurately fits between the bosses 32 on the forward ends of arms 31 of the sub-frame 26. An elongated pivot pin 43 extends through aligned bores in bosses 32 and 42, being retained therein by means not shown. From the ends of boss 42, as best shown in FIG. 3, there depend similar parallel arms 44, a longitudinally extending movable jaw body 45 being integrally attached to such arms. The jaw body 45 overlies and cooperates with a portion of the portion 51 of the clip body somewhat rearwardly of the forward edge thereof as shown in FIGS. 4 and 5. In operation, the movable jaw lies in a plane inclined downwardly and rearwardly at a small angle with respect to a vertical axial plane through pivot pin 43, and thus makes a large acute angle with respect to the plane of sheet material 12. By reason of such geometry, the jaws grip the material more strongly as the stretching pull upon material 12 increases.

In the embodiment shown, the jaw body 45 is longitudinally slotted as shown at 46, there being an elongated intermediate jaw member 47 mounted in slot 46 for limited pivotal movement about a longitudinally central pivot pin 49 which extends through body 45 on both sides of the slot and through member 47, as shown. A round elongated hardened metal material-gripping insert 50 is secured in a seat on the lower edge of member 47 as by brazing or soldering. The lower surface of insert 50 is finely serrated, as shown. When the upper movable jaw is in closed position, insert 50 functions to grip the edge of a sheet of material 12 between it and a somewhat more coarsely serrated zone on the upper surface of a metal plate 52 made, for example, of stainless steel which covers the upper and forward surfaces of portion 51 of the body of the clip. It is to be understood that the described details of slot 46, intermediate jaw member 47, and insert 50 are not a part of this invention, and that the upper jaw member and its gripping element may be made in other known manners.

The upper jaw operating mechanism of the illustrative clip in accordance with the invention includes a central arm 54 integral with boss 42 and extending rearwardly therefrom. Arm 54 has an axial, rearwardly open blind bore 55 therein, there being a headed cylindrical plunger 56 slidably mounted within the outer portion of bore 55.

Plunger 56 is constantly urged forcibly in a direction outwardly of the bore by a coil compression spring 57 interposed between the bottom of the bore and the inner end of the plunger. The head on plunger 56, designated 59, is elongated transversely of the axis of the plunger and extends in both directions therefrom. Head 59 has a semi-circular cylindrical surface 60 on its outer end, the ends of surface 60 merging with the outer ends of flat parallel surfaces 61 on the opposite sides of the head.

The arm 54 cooperates with an arm 62 which is aligned therewith in the central transverse plane of the clip, arms 54 and 62 constituting a toggle which is stably retained in a selected one of two positions: (1) the open, material-receiving position of the upper jaw, and (2) the closed, material gripping position of the upper jaw.

The arm 62 is a part of a bellcrank having a second, upstanding rounded clip operating arm 70 and a hub or boss 66 at the junction of arms 62 and 70. Hub 66 has a bore 68 therethrough; lever 62, 70 is pivotally supported on sub-frame 26 at the upper rear edges of the sub-frame by a pivot pin 67 which extends through bores 63 in the sub-frame and bore 68 in hub 66 of the lever.

The forward end of arm 62 is provided with a seat receiving the head 59 of the plunger 56. Such seat has a central inner portion 64 in the form of a part of a circular cylinder, the ends of portion 64 merging with flat surfaces 65 which diverge forwardly at an acute angle sufficient to provide the described toggle with freedom of movement between its two terminal positions over the entire range of adjustment of the sub-frame of the clip.

Lever arm 34 on the sub-frame 26 has an upstanding end portion 71 which functions positively to stop movement of toggle arms 54 and 62 from further downward movement when the upper surface 61 of the plunger head substantially contacts the upper surface 65 of the seat in arm 62, thereby preventing the imposition of undesirable bending stress upon the parts of the toggle in any of the adjusted positions of the clip.

The clip also provides a positive stop against movement of the toggle-forming parts thereof upwardly past their full line positions in FIG. 5. Thus, in such position of the parts, zones 72 at the ends of the upper rear corner of the movable jaw body 45 engages zones 74 at the forward lower edge of arms 31 of sub-frame 26.

The toggle 54, 62 lies stably in either its lower position, at which the movable jaw of the tenter clip is in closed, operative position, or its upper position, shown in phantom lines in FIGS. 4 and 5, at which the movable jaw is open. The toggle is ordinarily stopped in its lower position by engagement of the movable jaw with sheet material which it grips in cooperation with the fixed jaw. In some positions of adjustment of the clip the part 71 of lever 34 may function to stop the toggle in its terminal lower position. As above mentioned, the zones 72 on the movable jaw and zones 74 on arms 31 function to stop the toggle in its upper position.

The coil compression spring 57 of the toggle not only functions to retain the toggle stably in both its upper and lower positions, but also acts, when the toggle is in its lower position, to bias the movable jaw clockwise (FIGS. 4 and 5) so that the movable jaw is thrust with appreciable force into initial contact with the material. Thus, any initial slippage between the material and the gripping jaws is avoided, and the gripping force exerted by spring 57 upon the jaws of the clip is additive to that produced by the inward pull of the material 12 as it is being stretched.

As above noted, the clips 13 are closed upon the edges of a sheet of material 12 by the interaction of cam tracks 17 upon the end of the operative run of the chains by tracks 19. The described angular adjustment of sub-frame 26 to adjust the opening of the mouth of the clip will, of course, displace the operating lever 70 somewhat. This is unobjectionable, however, since the snap action of the toggle makes it unnecessary for lever 70 to throw the toggle much past its dead center, in moving the toggle from one terminal position to the other, since the spring 57 then takes over to complete the travel of the toggle into its new position. Thus the positioning of cam tracks 17 and 19 relative to levers 70 is not critical.

When a sheet material 12 having a thickness different from that previously run is to be handled by the tentering apparatus, the clips 13 are opened and adjusting stud 40 is turned so that a feeler gauge related to the thickness of the new material just enters between the fixed and movable jaws of the clip. Having thus arrived at a predetermined height of the mouth of the open clip, the clip when closed will have a predetermined desired gripping action on the sheet 12, since there is a constant difference in the height of the movable jaw above the fixed jaw at its open and closed positions, regardless of the adjusted position of the sub-frame.

In some instances, it is desirable to eliminate the necessity for the use of the described feeler gauge in the adjustment of the clips for gripping material of different thicknesses. The modified clip 13' shown in FIG. 7 accomplishes this in a simple economical manner. Such clip is generally the same as that of FIGS. 2–6 inclusive, and has the parts thereof designated by the same reference characters except for the parts now to be described.

The adjusting stud 40' for sub-frame 26 is provided with a graduated dial 79 in the form of a handle affixed to its outer end. Cooperating with the dial is a pointer 80 fixed to pedestal 39. The stud 40' may have the threads thereon of such pitch, that one turn of the stud 40' will pivot the sub-frame 26 from one of its terminal positions to the other. The graduations on dial 79 may be such as to indicate directly the angular positions at which the dial is to be set for each of the thicknesses of sheet material to be treated in the tentering apparatus.

A third embodiment of tenter clip in accordance with the invention is shown in FIGS. 8 and 9. Parts of such clip which are similar to those of the previously described embodiments are designated by the same reference characters. The clip differs from that of FIG. 7 by the substitution of a rudimentary gear or star wheel 81 for the dial 79 of the clip of FIG. 7. Wheel 81, which is affixed to adjusting stud 40 to rotate the stud, has a plurality (six shown) of equally angularly spaced radial arms 82 separated by rounded seats 84. Wheel 81 is adapted to be rotated incrementally in either direction by selectively operated means which is located at a convenient location relative to the path of travel of the clips on the chain. To adjust the open postion of the movable jaws of all the clips on the chains it is necessary only to place the correct operating means for the star wheel 81 in operative position with respect thereto, and to run the chains without sheet material in the clips thereof a desired number of times past the clip adjusting means.

The mechanism which selectively cooperates with the wheel 81 thus to adjust the clips is shown in FIG. 9. As there shown, a bracket 86 is positioned on a support such as a part 85 of the chain supporting track. Bracket 86, and a similar bracket for the other chain of the tentering apparatus, will be positioned, for example, at locations designated A and B, respectively, in FIG. 1. Bracket 85 has upper and lower horizontal guideways, not specifically shown, which support upper and lower bars 87 and 89 for selective advance toward the star wheel 81 or for retraction into the inoperative position of each shown in FIG. 9.

Bars 87 and 89 have forward tooth-like ends 95 and 96, respectively, which interfit between the arms 82 of wheel 81, that is, they mesh with the wheel when the bars are projected forwardly into their operative positions. Together the end 95 of bar 87 and the arms 92 of wheel 81 form an escapement, the action of which may be seen in FIG. 8 wherein the forward ends 95 and 96 of bars 87 and 89 are shown in phantom lines. The same is true of end 96 of bar 89 and the arms of the wheel. Depending upon which bar is advanced and which is retracted, the wheel 81 and stud 40 will be rotated in reverse directions through 60° upon each transverse of the clip past the bracket 86. In an illustrative embodiment of clip, the pitch of the thread on stud 40 is such as to require the stud to be turned 480° for full adjustment of the clip from one terminal open position of the movable jaw of the clip to the other terminal open position thereof. Thus with the mechanism shown the clips can be adjusted over their full range in one direction by causing the clips to travel eight times past bracket 86 and one of bars 87 and 89 advanced into operative position.

In FIG. 9 the bars 87 and 89 are shown provided with stop collars 92 and 94 to limit their advance. The bars are also shown with operating handles 90 and 91 at their rear, outer ends. The end 95 of the lower bar lies appreciably below the axis of wheel 81, and thus turns the wheel counterclockwise as the clip travels past the bar in a direction from right to left in FIG. 8. The end 96 of the upper bar, being located appreciably above the axis of wheel 81, causes the wheel to turn clockwise under the same conditions. If desired, means such as a centrally pivoted link may be employed to connect the outer ends of the bars to retract each of the bars from its operative, advanced position when the other bar is advanced, thus preventing the simultaneous engagement of wheel 81 by both bars 87 and 89. The bars 87 and 89 may also be moved as described, if desired, by remotely controlled means such as solenoids, such system also preferably being provided with interlocking safety means to prevent the simultaneous advance of both bars.

Although only a limited number of embodiments of tentering apparatus and tenter clips have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. A tenter clip comprising a frame, a material gripping jaw on the frame, a sub-frame pivotally mounting a movable jaw at one location on the sub-frame, means pivotally mounting the sub-frame on the frame at a second location substantially spaced from said first location whereby the movable jaw may be moved toward and away from the gripping jaw on the frame to adjust the opening of the mouth of the clip between the two jaws, and means for moving the movable jaw with respect to the sub-frame from its open position with respect to the jaw on the frame to its closed position with respect to the latter jaw, and adjusting means for the sub-frame, said adjusting means including an abutment means adjustably mounted on a fixed part of the frame and having an adjustable abutment surface bearing on the sub-frame at a location remote from the pivotal connection between the frame and the sub-frame.

2. A tenter clip as claimed in claim 1, wherein the abutment means is a stud threaded in said fixed part of the frame, and comprising a dial fixedly connected to said adjusting stud, a fixed pointer cooperating with said dial, and indicia on the dial for indicating the adjustment of the sub-frame.

3. A tenter clip as claimed in claim 1, comprising means on the sub-frame resiliently urging the movable jaw into initial gripping engagement with the material when the movable jaw is in its closed position, the last named means including a toggle which selectively stably retains the movable jaw in its open and closed positions with respect to the sub-frame.

4. A tenter clip as claimed in claim 3, wherein the toggle is composed of a first arm which forms a portion of a two-armed crank of which the movable jaw forms the other arm, and a second arm generally aligned with the first arm and pivoted on the sub-frame at a location substantially spaced from the pivotal axis of the movable jaw and the crank of which the movable jaw is a part, the confronting ends of the first and second arms being pivotally connected.

5. A tenter clip as claimed in claim 4, wherein the second arm of the toggle forms a part of a second two-armed crank having a further arm functioning as an operating lever selectively to operate the toggle to move the movable jaw to its open and closed positions.

6. A tenter clip as claimed in claim 4, wherein the pivotal connection between the first and second arms includes a spring urging the engaging ends of the first and second arms together.

7. A tenter clip as claimed in claim 4, wherein one of the first and second arms has an end portion separate from and slidable longitudinally with respect to the remainder of said arm, and a coil compression spring thrusting the said separate end portion outwardly with respect to the remainder of its arm and into engagement with the confronting end of the other arm.

8. A tenter clip as claimed in claim 4, comprising a stop means mounted on the sub-frame for positively engaging at least one of the first and second arms of the toggle when the movable jaw is in at least one of its adjusted closed, material engaging positions.

9. A tenter clip as claimed in claim 4, comprising a stop means mounted on the sub-frame for positively engaging a portion of the movable clamping jaw when the movable jaw is in its open, material receiving position.

10. A tenter clip as claimed in claim 1, comprising means constantly urging the sub-frame about its pivotal axis on the frame in the direction to withdraw the movable jaw toward a terminal position away from the jaw mounted on the frame, said adjusting means determining the terminal position of the sub-frame.

11. Tentering apparatus comprising a chain having a plurality of serially connected tenter clips, means for supporting the chain, the tenter clips each comprising a frame, a first, material gripping jaw on the frame, a sub-frame carrying a second, movable jaw, means for moving the movable jaw with respect to the sub-frame from its open position with respect to the first jaw to its closed position with respect to the first jaw, each clip having means including a movable member for adjusting the portion of the sub-frame mounting the movable jaw and the movable jaw toward and away from the first gripping jaw to adjust the opening of the mouth of the clip between the first and second jaws, and selectively operable means mounted on fixed supporting structure past which the tenter clips move for selectively actuating the movable member.

12. Tentering apparatus as claimed in claim 11, wherein the selectively operable means on the supporting means for the chain for actuating the movable member is a means to move the movable member in a selected one of two directions.

13. Tentering apparatus as claimed in claim 11, wherein the movable member is rotatable, and the means for actuating the movable member when operable engages it each time the clip travels therepast.

14. Tentering apparatus as claimed in claim 13, wherein the movable member and the means for actuating the movable means, when the latter is operable, have engaging parts which form an escapement means which functions to turn the movable through a part of a revolution each time the clip travels past the means for actuating the movable member.

15. Tentering apparatus as claimed in claim 14, comprising a toothed wheel-like element fixedly connected to the movable member coaxial thereof, and wherein the means for actuating the movable means comprises a member having a projecting part fixed with respect to the direction of travel of the clip and adapted to mesh with the teeth on one side of the wheel-like element whereby to rotate such element as it engages and travels past the tooth-like part.

16. Tentering apparatus as claimed in claim 15, wherein there are two selectively operable means each having a member having a projecting part fixed with respect to the direction of travel of the clip, one of said selectively operable means being adapted to mesh with the teeth on one side of the wheel-like element whereby to rotate such element in one direction, the other of said selectively operable means being adapted to mesh with the teeth on the opposite side of the wheel-like element whereby to rotate such element in the other direction.

17. In a tentering system having two opposed similar but oppositely contoured tentering chains, means for driving the chains with their operative confronting runs in the same direction and at the same speed, the improvement which comprises tenter clips serially arranged on the chains, said tenter clips each having a frame and opposed fixed and movable jaws, means pivotally mounting the movable jaw on a portion of the frame for movement toward and away from the fixed jaw, means on each clip for moving the movable jaw between and selectively stably holding the movable jaw in open and closed positions, said last named means including means for selectively operating the movable jaw on each clip to move it to open and closed positions, a toggle which lies in stable opposite terminal positions when the movable jaw is in its respective open and closed positions, the toggle being made up of a first lever arm fixed to the movable jaw and a second lever arm, means pivotally mounting the second lever arm for movement parallel to that of the first lever arm on the same frame portion as the movable jaw, the two lever arms being aligned and the two pivotal mounting means therefor being substantially spaced, means including a resilient compressible member connecting the confronting ends of said two levers, the two levers being movable in opposite angular directions through the position in which they are aligned, said operating means including means positioned at the entering end of the operative, material gripping and stretching run of each of the chains for operating the jaw moving means to close the movable jaw of each of the clips, and means positioned at the exit end of the operative run of each of the chains for operating the jaw moving means to open the movable jaws of each of the clips.

18. A tentering system as claimed in claim 17, wherein the second lever arm is a part of a bell crank, said bell crank having a further, upstanding arm, said upstanding arm cooperating with the said two operating means for the movable jaw to open the movable jaw at the exit end of the operative run of the chains and to close the movable jaw at the entering end of the operative run of the chains.

References Cited by the Examiner
UNITED STATES PATENTS

| | | | |
|---|---|---|---|
| 366,431 | 7/87 | Schneider | 26—62 |
| 597,996 | 1/98 | Mather | 26—62 |
| 604,103 | 5/98 | Winsor | 26—62 |
| 616,390 | 12/98 | Arnold | 26—62 |
| 644,543 | 2/00 | Winsor | 26—62 |
| 829,360 | 8/06 | Whitley | 26—62 |
| 1,858,502 | 5/32 | Hinnekens | 26—62 |
| 1,880,776 | 10/32 | Butterworth | 26—62 |
| 2,923,966 | 2/60 | Tooke | 18—1 |
| 3,046,599 | 7/62 | Nicholas et al. | 18—1 |

WILLIAM J. STEPHENSON, *Primary Examiner.*